3,144,652
MANUFACTURE OF SULFENAMIDES FROM
MORPHOLINES
John J. D'Amico, Charleston, W. Va., assignor to Monsanto Company, St. Louis, Mo., a corporation of Delaware
No Drawing. Filed Nov. 17, 1961, Ser. No. 153,239
6 Claims. (Cl. 260—247.1)

The present invention relates to the manufacture of sulfenamides and more particularly to the manufacture of 2-(morpholinothio)benzothiazole and 2-(dimethylmorpholinothio)benzothiazole.

It is an object of the present invention to avoid the large excess of amine heretofore necessary for obtaining sulfenamides in satisfactory yield directly from morpholines. Oxidative condensation of mercaptobenzothiazole or disulfide thereof with amines is carried out on a large scale. It was early recognized that the reactions could be performed in aqueous alkaline medium, if desired, in the presence of indifferent organic solvent and aqueous medium proved eminently satisfactory for commercial use. Sulfenamides are insoluble in water and readily recovered from water by filtration. Unfortunately, oxidative condensation of morpholines to thiazole sulfenamides requires from 400–700% excess of amine for reasonably complete reaction. The recovery of morpholine from water is expensive, troublesome, and time-consuming but to discard the large excess required for condensation would be even more expensive. Alternate methods have been proposed which simplify or eliminate recovery of morpholine. These are based on condensation of N-chloromorpholine in inert organic solvent with alkali metal mercaptobenzothiazole, mercaptobenzothiazole or disulfide thereof. While morpholines and mercaptobenzothiazole are commercially available, N-choloromorpholine and alkali metal mercaptobenzothiazoles must be specially prepared. Moreover, N-chloromorpholine is a relatively unstable substance, difficult to handle.

According to this invention, oxidative condensation of substantially equal moles of mercaptobenzothiazole and morpholine is effected in inert organic solvent with inorganic oxidizing agent. The sulfenamide is isolated from the reaction mixture and if desired the inert organic solvent can also be recovered. By inert solvent is meant one which is inert to the reactants and to the desired product. Low boiling alcohols are most satisfactory, especially water miscible lower alcohols. In place of mercaptobenzothiazole, 2,2' - dithiobis(benzothiazole) may be substituted in which case a substantially equivalent proportion of morpholine should be used. By equivalent proportion is meant a proportion substantially equivalent to the theoretical quantity depending upon the thiazole reactant. The exact theoretical quantity is one mole per mole of product to be formed. Due to variation in weighing and other uncontrollable variables inherent in a chemical process, it is expedient to use somewhat more than the exact theoretical quantity thereby providing a margin of safety. Substantially the theoretical quantity will be understood to include a modest excess sufficient uniformly to provide optimum yields but not more than 50% in excess of the exact theoretical quantity. It is difficult to recover morpholine from a medium containing water and this invention provides a process wherein addition of water is contemplated but no recovery of the morpholine reactant is necessary although recovery may be practiced if desired. An excess of considerably less than 50% usually provides optimum yields and no advantage will be derived from charging more. For example, yields were the same employing approximately 5%, 10% and 25% excess morpholine respectively in reacting 0.24 gram mole of 2,2'-dithiobis(benzothiazole) in 200 ml. of isopropanol.

In place of morpholine, 2,6-dimethylmorpholine and 3,5-dimethylmorpholine may be substituted with essentially equivalent results. The preferred inert organic solvent is isopropanol but methanol, ethanol, and t-butanol also give good results. Pyridine is somewhat less efficacious. The preferred inorganic oxidizing agent is NaOCl. Others which may be mentioned are NaOBr, KOCl, NaOI, $H_2O_2$, $K_2S_2O_8$, $Cl_2$, $Br_2$ and $K_3Fe(CN)_6$. An advantage of the process is the utility of economical inorganic oxidizing agents. Where appropriate the oxidizing agent may be added in the form of an aqueous solution.

As noted, the success of the reaction is in nowise dependent upon completely anhydrous conditions. In fact, with isopropanol the initial charge may contain substantial quantities of water. For example, 88% isopropanol caused no diminution in yield or quality of product. On the other hand, excessive quantities of water adversely affect both yield and product quality. As would be expected the deleterious effects of increasingly aqueous reaction medium can be compensated by increasing the ratio of morpholine. In one series of experiments employing 150 ml. of isopropanol containing 0.25 mole of 2,2'-dithiobis(benzothiazole) and 5% excess of morpholine as the base reaction medium the results indicated that increasing the total water content from 200 to 250 ml. at the end of the reaction was deleterious. However, the effect could be overcome by increasing the excess of morpholine to 17%. Obviously, this compensating feature has practical limits. The amount and concentration of isopropanol can vary and operable limits cannot be defined for all conditions but a few simple experiments of routine nature will determine suitability of any concentration of isopropanol desired in a given instance. Deliberate addition of water is considered disadvantageous and increases the load on the isopropanol recovery system. The amount of solvent used should be sufficient to give an easily stirrable reaction mixture. With 0.25 mole of 2,2'-dithiobis (benzothiazole), 100 ml. is sufficient.

The temperature of heating will in general fall within the range of 45–80° C. However, these are not the absolute limits and temperatures either higher or lower can be used under some circumstances. The optimum temperature will vary depending upon other reaction conditions. Of course, increasing the reaction temperature reduces reaction time but for optimum yields the temperature should be low enough to avoid significant decomposition of the product. Optimum results may be secured at 45–60° C. under the conditions of the following examples. As the reaction proceeds, the initial slurry gradually gives the appearance of a turbid liquid but upon discontinuing the stirring it separates into two clear liquid layers. The aqueous salt layer may be drawn off and discarded and the product removed from the organic layer or other means of recovery employed. A variety of procedures for washing and drying arylenethiazole sulfenamides are described in the technical and patent literature and any of these may be used in connection with the process of this invention. For example, warm water may be added to the reaction mixture and the reaction mixture heated following which sulfenamide is drawn off. The wet molten sulfenamide may then be fed into a steam-jacketed, tubular bowl centrifugal separator operated above the melting point of the product. For optimum yields is is deirable to use sodium hypochlorite in 40–100% excess of the calculated theoretical quantity. The examples illustrate the invention in greater detail.

*Example 1*

The reaction was carried out in a one liter, three-necked resin flask, equipped with a stirrer, condenser, thermometer and dropping funnel. A stirred slurry containing 79.0 grams (0.24 mole) of 2,2'-dithiobis(benzothiazole), 300 ml. of isopropyl alcohol and 43.6 grams (0.5 mole) of morpholine was heated at 50–60° C. for one hour. After cooling to 45° C., 220 ml. (0.45 mole—80% excess) of aqueous sodium hypochlorite (15.2 grams per 100 ml.) was added dropwise at 45–50° C. over a two hour period. After 90% of the sodium hypochlorite solution was added, it was noted that two layers formed upon stopping the stirrer. The stirred reaction mixture was maintained at 45–50° C. for an additional hour. Five grams of sodium sulfite and one liter of water were added to the stirred reaction mixture. The stirred reaction mixture was cooled to 10° C., the resulting solid was collected by filtration, washed with water until the wash water was neutral to litmus and air-dried at 50° C. The product, 2-(morpholinothio)benzothiazole, M.P. 84–86° C., was obtained in 96.0% yield. Substituting 300 ml. of ethanol in the foregoing structure resulted in 91.8% yield. Both yield and quality of product were depressed somewhat when 300 ml. of pyridine was used in place of isopropyl alcohol.

*Example 2*

A stirred slurry containing 42 grams (0.25 mole) of mercaptobenzothiazole, 150 ml. of isopropyl alcohol and 21.8 grams (0.25 mole) of morpholine was heated at 45–50° C. for one hour. To the stirred slurry, 140 ml. (0.375 mole—50% excess) of aqueous sodium hypochlorite (20.2 grams per 100 ml.) was added dropwise at 45–50° C. over a two hour period. After 90–95% of the sodium hypochlorite solution was added, it was observed that two layers formed upon stopping the agitation. The stirred reaction mixture was maintained at 45–50° C. for an additional hour. Five grams of sodium sulfite and one liter of water were added to the stirred reaction mixture. Upon cooling to 10° C., the resulting solid was collected by filtration, washed with water until the washings were neutral to litmus and air-dried at 50° C. The product, 2-(morpholinothio)benzothiazole, M.P. 84–86° C., was obtained in 95.1% yield.

Employing 2,2'-dithiobis(benzothiazole), isopropanol and a 5 mole percent excess of 2,6-dimethyl morpholine at reaction temperature of 65° C. and 60 mole percent excess of sodium hypochlorite solution, 2,6-dimethyl (morpholinothio)benzothiazole of excellent quality was obtained in 97% yield.

The sulfenamide, 2-(morpholinothio)benzothiazole, is relatively unstable as evidenced by the fact deterioration in storage has been a vexing problem. The evidence indicates that the process of this invention yields from morpholine a product having greater storage stability than commercial material heretofore available. In carrying out the process of this invention the actual bringing together of the reactants and allied materials can be conducted in any of various ways. For example, good results were obtained by carrying out the reaction of Example 2 by adding concurrently a slurry of mercaptobenzothiazole in isopropanol and a solution of sodium hypochlorite in water to a solution of morpholine in isopropanol. While water miscible monohydric alcohols are much preferred as solvents the products form from substantially equivalent quantities of the organic reactants in non alcoholic water immiscible solvents. Carrying out the oxidative condensation of 2,2'-dithiobis(benzothiazole) and morpholine at 65° C. in toluene employing 16% excess of morpholine and aqueous sodium hypochlorite as oxidizing agent produced the sulfenamide in above 90% yield although quality was impaired somewhat. Where desired it is feasible to charge the thiazole reactant in slight excess and for some purposes that may be preferable. Thus charging 2,2'-dithiobis(benzothiazole) in an amount 10% by weight in excess of the sulfenamide expected from the morpholine charge on the basis of prior experience as illustrated in the foregoing example yielded sulfenamide of M.P. 70–88° C. containing about 5% 2,2'-dithiobis(benzothiazole). The reaction was carried out in isopropanol at 65° C. The total weight of product exceeded the theoretical calculated from the morpholine charged and indicated that the morpholine was quantitatively converted to sulfenamide. The products of this invention are valuable for accelerating the vulcanization of rubber and for some accelerating purposes product containing up to about 15% 2,2'-dithiobis(benzothiazole) is desirable. Such products can be made directly by the process of this invention.

It is intended to cover all changes and modifications of the examples of the invention herein chosen for purposes of disclosure which do not constitute departures from the spirit and scope of the invention.

What is claimed is:

1. A process of making sulfenamides which consists essentially in oxidizing a mixture of substantially one molecular proportion of a member of the group consisting of 2-mercaptobenzothiazole and 2,2'-dithiobis(benzothiazole) and substantially one equivalent proportion of a member of the group consisting of morpholine and dimethylmorpholine with an inorganic oxidizing agent selected from the class consisting of alkali metal hypohalite, hydrogen peroxide, potassium persulphate, potassium ferricyanide, chlorine and bromine in water miscible monohydric alcohol and recovering 2-benzothiazole sulfenamide corresponding to the amine reactant.

2. The process of making sulfenamides which consists essentially in oxidizing a mixture of substantially one molecular proportion of a member of the group consisting of 2-mercaptobenzothiazole and 2,2'-dithiobis(benzothiazole) and substantially one equivalent proportion of a member of the group consisting of morpholine and dimethylmorpholine in a water miscible lower alcohol with alkali metal hypochlorite at 45–80° C. and recovering 2-benzothiazole sulfenamide corresponding to the amine reactant.

3. The process of making sulfenamides which consists essentially in oxidizing a mixture of substantially one molecular proportion of a member of the group consisting of 2-mercaptobenzothiazole and 2,2'-dithiobis(benzothiazole) and substantially one equivalent proportion of a member of the group consisting of morpholine and dimethylmorpholine in a water miscible lower alcohol by adding to the alcohol reaction mixture at 45–80° C. aqueous sodium hypochlorite and recovering 2-benzothiazole sulfenamide corresponding to the amine reactant.

4. The process of making sulfenamides which consists essentially in oxidizing substantially equal molecular proportions of 2-mercaptobenzothiazole and morpholine in isopropanol by adding to the reaction mixture at 45–80° C. aqueous sodium hypochlorite and recovering 2-benzothiazole sulfenamide corresponding to the amine reactant.

5. The process of making sulfenamides which consists essentially in oxidizing substantially one molecular proportion of 2,2'-dithiobis(benzothiazole) with substantially two molecular proportions of morpholine in isopropanol by adding to the reaction mixture at 45–80° C. aqueous sodium hypochlorite and recovering 2-benzylthiazole sulfenamide corresponding to the amine reactant.

6. The process of making sulfenamides which consists essentially in oxidizing substantially one molecular proportion of 2,2'-dithiobis(benzothiazole) with substantially two molecular proportions of 2,6-dimethylmorpholine in isopropanol by adding to the reaction mixture at 45–80° C. aqueous sodium hypochlorite and recovering 2-benzothiazole sulfenamide corresponding to the amine reactant.

References Cited in the file of this patent

UNITED STATES PATENTS

| | | |
|---|---|---|
| 2,045,888 | Tschunkur et al. | June 30, 1936 |
| 2,271,834 | Carr | Feb. 3, 1942 |
| 2,758,995 | Sullivan | Aug. 14, 1956 |
| 2,871,239 | D'Amico | Jan. 27, 1959 |

FOREIGN PATENTS

| | | |
|---|---|---|
| 841,419 | Great Britain | July 13, 1960 |